(12) United States Patent
Spesser et al.

(10) Patent No.: US 11,228,255 B2
(45) Date of Patent: Jan. 18, 2022

(54) RECTIFIER ASSEMBLY

(71) Applicants: Dr. Ing. h.c. F. Porsche Aktiengesellschaft, Stuttgart (DE); Fraunhofer-Gesellschaft zur Foerderung der angewandten Forschung e.V., Munich (DE)

(72) Inventors: Daniel Spesser, Illingen (DE); Tim Pfizenmaier, Leonberg (DE); Stefan Endres, Reichenschwand (DE); Christoph Sessler, Erlangen (DE)

(73) Assignees: Dr. Ing. h.c. F. Porsche Aktiengesellschaft; Fraunhofer-Gesellschaft zur Foerderung der angewandten Forschung e.V.

( * ) Notice: Subject to any disclaimer, the term of this patent is extended or adjusted under 35 U.S.C. 154(b) by 67 days.

(21) Appl. No.: 16/819,827

(22) Filed: Mar. 16, 2020

(65) Prior Publication Data
US 2020/0295670 A1 Sep. 17, 2020

(30) Foreign Application Priority Data
Mar. 14, 2019 (DE) ............ 10 2019 106 485.6

(51) Int. Cl.
*H02M 7/217* (2006.01)
*H02J 7/02* (2016.01)
(Continued)

(52) U.S. Cl.
CPC ............ *H02M 7/217* (2013.01); *B60L 53/16* (2019.02); *B60L 53/18* (2019.02); *H02J 7/02* (2013.01);
(Continued)

(58) Field of Classification Search
CPC ........ H02M 7/217; B60L 53/16; B60L 53/18; H02J 7/02; H02J 2207/20; B60K 6/28; B60Y 2200/91; B60Y 2200/92
(Continued)

(56) References Cited

U.S. PATENT DOCUMENTS 5,952,812 A * 9/1999 Maeda .................... B60L 53/20
318/803
8,138,638 B2 * 3/2012 Mallwitz ........... H02M 3/33523
307/151
(Continued)

FOREIGN PATENT DOCUMENTS

EP 0 660 498 6/1995
EP 2179882 A2 * 4/2010 ............. B60L 50/51
EP 2 567 857 3/2013

OTHER PUBLICATIONS

German Examination Report dated Oct. 18, 2019.
(Continued)

*Primary Examiner* — Suresh Memula
(74) *Attorney, Agent, or Firm* — Gerald E. Hespos; Michael J. Porco; Matthew T. Hespos

(57) ABSTRACT

A rectifier assembly (20) for rectifying an AC voltage into a DC voltage has at least one first terminal (21, 22, 23), a second terminal (24) and an intermediate circuit (50). The first terminal (21, 22, 23) is connected via a circuit (31, 32, 33) to a neutral point (40), and the second terminal (24) is connected to the neutral point (40). The circuit arrangement (31, 32, 33) has a first branch (81) and a second branch (82) connected in parallel with the first branch (81). Both branches (81, 82) comprise a changeover arrangement (92, 93) and a coil (91, 94) connected in series with the changeover arrangement. The coil (91) in the first branch (81) is on the side of the changeover arrangement (92) averted from
(Continued)

the neutral point (40), and the coil (94) in the second branch (82) is on the side facing the neutral point (40).

14 Claims, 8 Drawing Sheets

(51) Int. Cl.
  *B60L 53/18* (2019.01)
  *B60L 53/16* (2019.01)
  *B60K 6/28* (2007.10)

(52) U.S. Cl.
  CPC ............. *B60K 6/28* (2013.01); *B60Y 2200/91* (2013.01); *B60Y 2200/92* (2013.01); *B60Y 2300/91* (2013.01); *H02J 2207/20* (2020.01)

(58) Field of Classification Search
  USPC .......................................................... 320/109
  See application file for complete search history.

(56) References Cited

U.S. PATENT DOCUMENTS

| | | | | |
|---|---|---|---|---|
| 8,693,214 | B2* | 4/2014 | Krause | H02M 3/33523 363/21.02 |
| 9,455,641 | B2* | 9/2016 | Kondo | H02J 7/342 |
| 2010/0220501 | A1* | 9/2010 | Krause | H02M 1/10 363/17 |
| 2015/0061606 | A1* | 3/2015 | Pan | H02P 9/008 322/7 |
| 2018/0262109 | A1* | 9/2018 | Kolb | H02M 7/4837 |

OTHER PUBLICATIONS

German Examination Report dated Dec. 20, 2019.
Wen-Long Ming et al.—"A Single-Phase Rectifier Having Two Independent Voltage Outputs With Reduced Fundamental Frequency Voltage Ripples"—IEEE Transations on Power Electronics—2015, vol. 30, Issue 7, pp. 3662-3673.
Jarno Alahuhtala et al.—Four-Wire Unidirectional Three-Phase/Level/Switch (VIENNA) Rectifier, IECON 2006—32nd Annual Conference on IEEE Industrial Electronics—2006, pp. 2420-2425.
Saman Dadjo Tavakoli et al.—"Interlinking Converters in Application of Bipolar DC Microgrids"—2017 8th Power Electronics, Drive Systems & Technologies Conference (PEDSTC)—2017—pp. 37-42.
J.C. Le Claire—"Double Boost Effect Topology for three-phase AC/DCConveter with Unity Power Factor"—2009—13th European Conference on Power Electronics and Applications—2009.

* cited by examiner

RECTIFIER ASSEMBLY

BACKGROUND

Field of the Invention

The invention relates to a rectifier assembly.

Related Art

US 2015/0061606 A1 discloses a rectifier for generators with different speeds and a plurality of passive rectifiers, which are connected in series.

U.S. Pat. No. 5,952,812 A discloses an inductance or coil, which is connected in parallel with the input terminals of a rectifier.

US 2010/0220501 A1 discloses a rectifier which, on the output side, is connected to two parallel-connected inverters, which inverters respectively supply an associated transformer.

EP 2 567 857 A1 discloses an interconnection of all the phases of a voltage converter by means of a switching mechanism.

EP 0 660 498 A2 discloses a Vienna rectifier and the mode of operation thereof.

One object of the invention is the provision of a novel rectifier assembly and a novel vehicle having such a rectifier assembly.

SUMMARY

A rectifier assembly for the rectification of an AC voltage into a DC voltage comprises at least a first terminal, a second terminal and an intermediate circuit. The intermediate circuit comprises a first conductor, a second conductor and at least one capacitor between the first conductor and the second conductor. The at least one first terminal is connected via an associated circuit arrangement to a neutral point, and the second terminal is likewise connected to the neutral point. The circuit arrangement comprises a first branch and a second branch, which second branch is connected in parallel with the first branch, which first branch and second branch respectively comprise a changeover arrangement and a coil connected in series with said changeover arrangement, which coil in the first branch is provided on the side of the changeover arrangement which is averted from the neutral point, and which coil in the second branch is provided on the side of the changeover arrangement which faces the neutral point, which changeover arrangements respectively comprise at least one controllable switch and permit a current flow between the associated branch and the intermediate circuit, wherein, in a first state Z1 of the at least one controllable switch, a current flow between the first terminal and the neutral point via the changeover arrangement is suppressed, and wherein, in a second state Z2 of the at least one controllable switch, a current flow between the first terminal and the neutral point via the changeover arrangement is possible.

By means of the two branches, which are mutually inverted with respect to the arrangement of the coil, novel possibilities come about in that, via one of the first terminals, in a preselected half-wave, the intermediate circuit can be energized from both above and below. This permits the achievement of a smaller ripple current, and also provides advantages with respect to any discharge currents occurring.

The rectifier assembly may comprise at least three first terminals that are connected to the neutral point via the respectively associated circuit arrangement. A triple-phase current can also be processed via three first terminals.

According to one embodiment, the rectifier assembly may comprise at least two first terminals that are connected to the neutral point via the respectively associated circuit arrangement, and the at least two first terminals may be interconnected electrically. The electrical connection or parallel connection of the circuit arrangements enables the total current on the at least two first terminals to be divided, and the circuit arrangements can thus be rated for lower maximum currents or maximum capacities.

The rectifier assembly may comprise a single first terminal. This is sufficient for a single-phase supply network.

The rectifier assembly may comprise a control device that is configured to influence the at least one controllable switch and thus can influence the operation of the rectifier assembly.

The control device may be configured for at least temporary pulsed actuation of the at least one controllable switch, such as by means of a PWM signal. The pulsed actuation enables the current injected into the intermediate circuit to be specified accurately.

According to one embodiment, the control device may be configured to simultaneously switch the at least one controllable switch of the first branch and the at least one controllable switch of the second branch of one of the least one first terminals, at least temporarily, to the first state. This permits an at least approximately symmetrical supply of the intermediate DC circuit, and thus a reduction of ripple currents in the intermediate circuit.

The control device may be configured, on one of the at least one first terminals, at least temporarily, to set the at least one controllable switch of the first branch to the first state Z1, and to set the at least one controllable switch of the second branch to the second state Z2, or vice versa. An asymmetrical supply of the intermediate circuit by means of this first terminal is accordingly possible. Optionally, this can be combined with an asymmetrical supply of one of the other first terminals.

At least one of the changeover arrangements may comprise a bridge rectifier. The bridge rectifier may comprise two bridge rectifier terminals, a first output, a second output and the at least one controllable switch. The bridge rectifier terminals may be connected to the associated branch. The first output is connected to the first conductor and the second output may be connected to the second conductor. The bridge rectifier may be configured:

in the first predefined state Z1 of the at least one controllable switch, to permit a current flow from at least one of the bridge rectifier terminals to the first output, but to prevent a current flow from the first output to the bridge rectifier terminals, in the first predefined state Z1 of the at least one controllable switch, to permit a current flow from the second output to at least one of the bridge rectifier terminals, but to prevent a current flow from the bridge rectifier terminals to the second output, in the first predefined state Z1 of the at least one controllable switch, to suppress a current flow between the two bridge rectifier terminals, and in the second predefined state Z2 of the at least one controllable switch, to permit a current flow between the two bridge rectifier terminals, in at least one direction. The employment of a bridge rectifier permits a preferred configuration of this functionality.

According to one embodiment, the bridge rectifier terminals may be connected respectively via a diode to a first point, and connected via a diode to a second point. The first point may be connected via a diode to the first output, and the second point may be connected via a diode to the second output. The configuration of the bridge rectifier with diodes permits a bridge rectifier circuit that is reliable in operation.

The at least one controllable switch may comprise a first controllable switch that is connected between the first point and the second point. The first controllable switch is non-conducting in the first state Z1 and is conducting in the second state Z2 such that, in the second state Z2, a connection is constituted between the first point and the second point. This solution permits a cost-effective configuration with a smaller number of controllable switches.

In one embodiment, the at least one controllable switch comprises a second controllable switch and a third controllable switch. The two bridge rectifier terminals of this embodiment may comprise a first bridge rectifier terminal and a second bridge rectifier terminal. The second controllable switch may be connected between the first bridge rectifier terminal and the first point, and the third controllable switch is connected between the first bridge rectifier terminal and the second point. This configuration requires additional switches. However, the power loss is lower, such that the circuit is particularly advantageous for high-capacity rectifiers.

According to one embodiment, the first bridge rectifier terminal is the bridge rectifier terminal that is assigned to the associated coil.

According to one embodiment, the second bridge rectifier terminal is the bridge rectifier terminal that is assigned to the associated coil.

According to one embodiment, the rectifier assembly comprises a network filter that permits a discharge current. The employment of a network filter of this type improves the EMC properties of the entire circuit, and the optimization by means of an appropriate setting of the controllable switch has a positive effect.

A vehicle that is configured as an electric vehicle or a hybrid vehicle may have a corresponding rectifier assembly. High-capacity rectifier assemblies are required in vehicles, and the rectifier assembly described, notwithstanding its high capacity, features comparatively low discharge currents.

According to one embodiment, the vehicle comprises a connector for the connection of a charging cable for the vehicle and, at least temporarily, a galvanic coupling is constituted between the terminals of the connector and the rectifier assembly. The vehicle may comprise a traction battery and, at least temporarily, a galvanic coupling is constituted between the terminals of the connector and the traction battery. In configurations of this type, discharge currents in the rectifier assembly also act externally to the vehicle, as no galvanic isolation is constituted.

Further details and advantageous further developments of the invention proceed from the exemplary embodiments described hereinafter and represented in the drawings, which are not to be understood by way of any limitation of the invention, and from the sub-claims.

DETAILED DESCRIPTION

Figure 1:
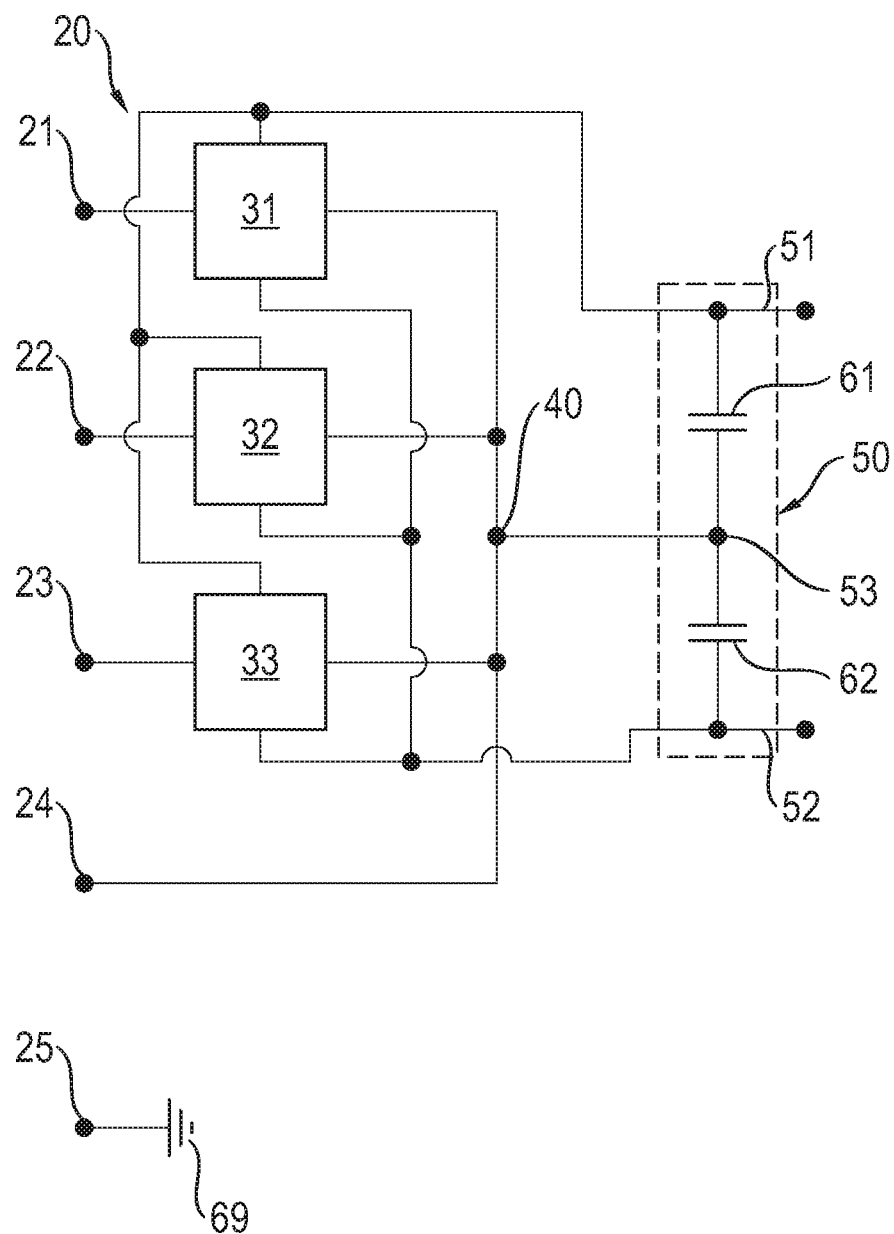
FIG. 1 shows a rectifier assembly with circuit arrangements.

FIG. 1 shows a rectifier assembly 20 for the rectification of an AC voltage into a DC voltage. The rectifier assembly 20 comprises a first terminal 21, a second terminal 22, a third terminal 23 and a fourth terminal 24. The rectifier assembly 20 has an intermediate circuit 50 with two capacitors 61, 62, a first conductor 51, a second conductor 52 and a node point 53. The node point 53 is connected via the first capacitor 61 to the first conductor 51, and via the second capacitor 62 to the second conductor 52. The capacitors 61, 62 are preferably intermediate circuit capacitors for the storage and release of energy in the intermediate circuit 50, and have an appropriate capacitance for the respective application instance. In the exemplary embodiment, the intermediate circuit is configured as an intermediate DC voltage circuit. The first terminal 21, the second terminal 22 and the third terminal 23 are respectively connected via an associated circuit arrangement 31, 32, 33 to a neutral point 40, and the fourth terminal 24 is also connected to the neutral point 40. The neutral point 40 is connected to the node point 53. Preferably, the rectifier assembly 20 additionally comprises a fifth terminal 25, via which a protective conductor PE (standing for "protective earth") of the supply network is connectable. On the fifth terminal 25, symbolically, a protective conductor symbol 69 is provided, which is symbolically employable in the rectifier assembly 20, in which the reference number 69 is also applied thereto. The use of a supply network with no protective conductor PE is also possible. Networks of this type are described as IT networks. The supply network can also be described as a network connection.

The circuit arrangements 31, 32, 33 are respectively configured to permit a current flow between the circuit arrangement 31, 32, 33, on the one hand, and the first conductor 51 or the second conductor 52 on the other hand. Insofar as the present application describes a current flow between two points, this does not imply any statement as to the direction of the current flow. For the charging of the capacitors 61, 62, a current preferably flows from the circuit arrangements 31, 32, 33 to the first conductor 51, and a current flows from the second conductor 52 to the circuit arrangements 31, 32, 33. The first conductor 51 thus assumes a higher potential than the second conductor 52.

The connection between the neutral point 40 and the node point 53 is advantageous if a neutral conductor is connected to the fourth terminal 24, as this results in a reference potential between the neutral conductor and the node point 53. The rectifier assembly 20 would also function in the absence of the connection between the neutral point 40 and the node point 53. If no neutral conductor is present on the fourth terminal 24, the variant with no connection between the neutral point 40 and the node point 53 can be advantageous, on the grounds of lower discharge currents. The potential on the node point 53, in the absence of this connection, is not fixed to a predefined potential on the terminal 24, but can vary. This is described as "free floating", and there is thus constituted no fixed relationship with a predefined potential. In the USA, for example, a neutral conductor is not present in some cases.

Alternatively, if no connection is provided between the neutral point 40 and the node point 53, the capacitors 61, 62 can be replaced by a single capacitor.

Mode of Operation

Different network connections exist, and the rectifier assembly 20 preferably operates with the greatest possible number of variants of network connections.

Figure 2:
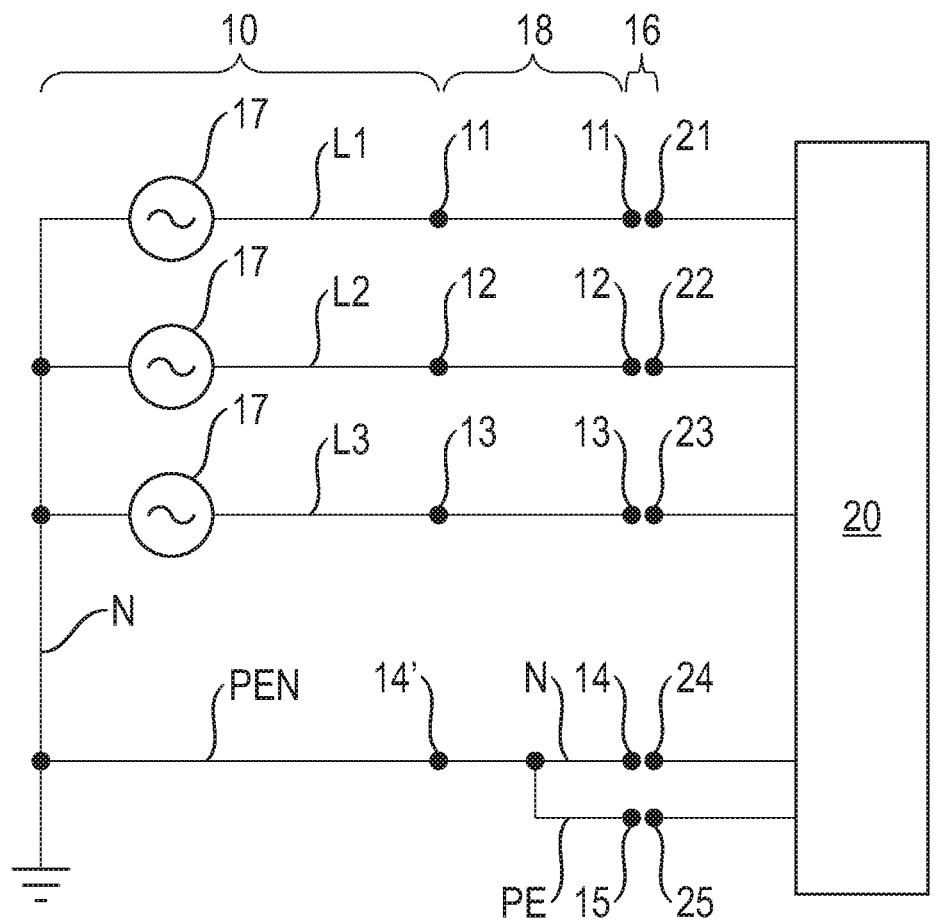
FIG. 2 shows the terminal of a supply network on the rectifier assembly according to FIG. 1.

FIG. 2, by way of an example, shows the customary supply network 10 in central Europe, which is configured as a TN system with three phases L1, L2 and L3, which are provided on associated terminals 11, 12, 13, and having a neutral point 14' as neutral conductor. The three phases L1, L2, L3 are supplied by the AC voltage sources 17, which have a respective phase difference of 120°. In the embodiment represented, the neutral conductor (N) 14' is grounded, and thus also functions as protective conductor (PE). This is described as a PEN conductor. Many other network connections also have a neutral conductor, but not all. In an intermediate station 18, for example a house or a charging station, the PEN terminal 14' is customarily divided into a neutral conductor terminal (N) 14 and a protective conductor terminal (PE) 15. The terminals 11, 12, 13, 14, 15 can be connected to the terminals 21, 22, 23, 24, 25, in order to operate the rectifier assembly 20. To this end, for example, a connector 16 is provided in a vehicle, via which the terminals 21 to 25 are directly or indirectly connected to the supply network 10. The terminals 21 to 24, which are responsible for actual current conduction, are also described as live terminals 21 to 24.

In a central European single-phase network, on the grounds of ambiguous plug connectors in countries such as Germany, there is no explicit association between the phase terminal L1 and the neutral conductor terminal N, and the phase terminal L1 can either be connected to the first terminal 21 and the neutral conductor terminal N to the fourth terminal 24, or vice versa. The protective conductor PE is connected to the fifth terminal 25. Either the explicit association can be established by an upstream circuit, or the rectifier assembly 20 is configured to operate with both variants. If the rectifier assembly is not intended for use in a triple-phase network, the second terminal 22 and the third terminal 23, together with the associated circuit arrangement 32, 33, can be omitted. The neutral point 40 can still be described, in analogous terms, as the neutral point 40, or in general terms as the point 40.

Conversely to a supply network 10 with a neutral conductor, the US supply network, for example, described by the term "split phase", comprises a first phase terminal and a second phase terminal, wherein the phase of the second phase terminal is phase-displaced by 180° in relation to the phase of the first phase terminal. The first phase terminal is designated as HOT1, and the second phase terminal as HOT2. A neutral conductor can be provided, but is not always provided. In many cases, a protective conductor PE is provided. In a supply network with no neutral conductor, the first phase terminal HOT1 can be connected to one of the terminals 21, 22, 23, or—for the reduction of currents in the circuit arrangements 31, 32, 33—to all three terminals 21, 22, 23, and the second phase terminal HOT2 can be connected to the fourth terminal 24. Thus, for example, rather than a neutral conductor, the phase terminal HOT2, which has a phase difference of 180° in relation to HOT1, would be connected to the fourth terminal 24.

Figure 3:
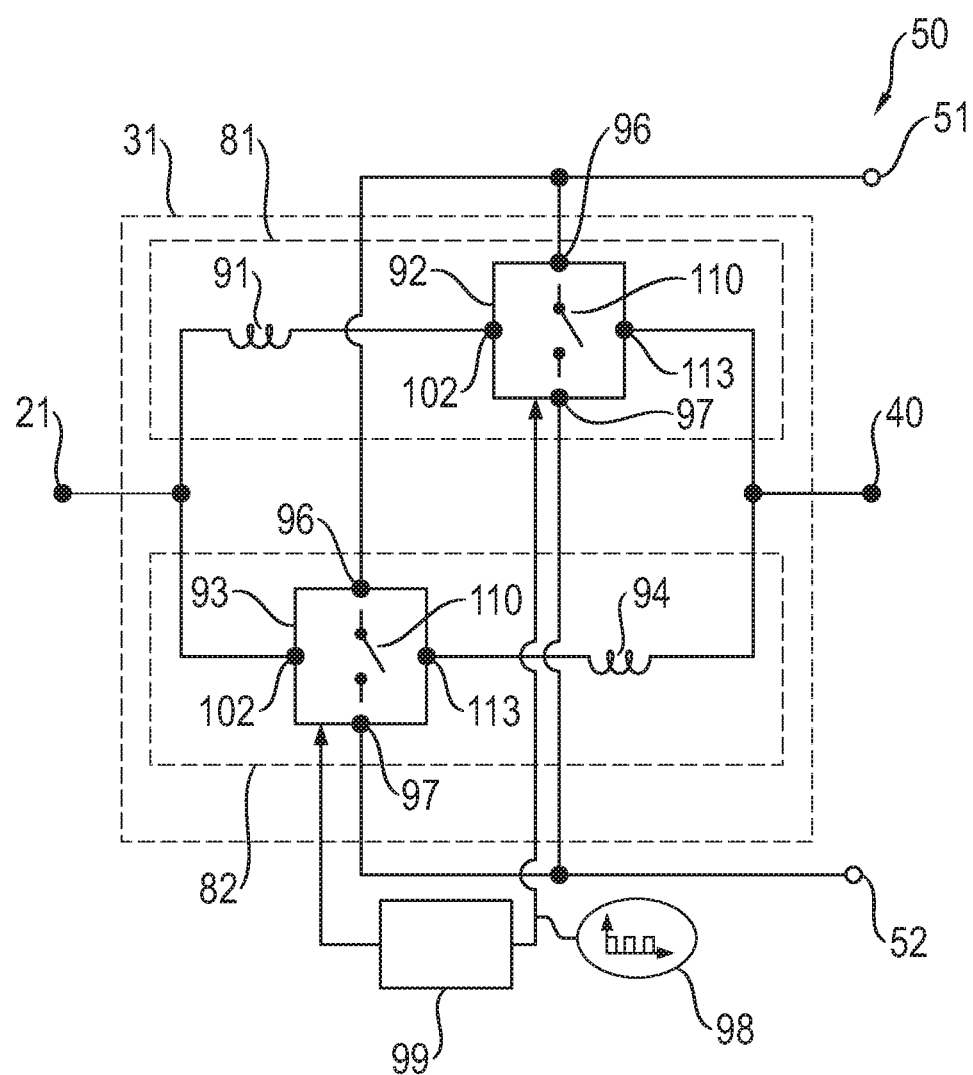
FIG. 3 shows an exemplary embodiment of a circuit arrangement of the rectifier assembly according to FIG. 1, with changeover arrangements.

FIG. 3 shows an exemplary embodiment of the circuit arrangement 31, which can be applied in the same manner for the circuit arrangements 32, 33.

The circuit arrangement 31, between the first terminal 21 and the neutral point 40, comprises a first branch 81 and a second branch 82 which is connected in parallel with the first branch 81. Additionally, an—unrepresented—third branch in the form of an X-capacitor can be provided between the first terminal 21 and the neutral point 40.

By way of distinction from a Vienna rectifier, the present rectifier is described as a Weissach rectifier or a Weissach rectifier assembly.

The first branch 81 and the second branch 82 respectively comprise a changeover arrangement 92, 93 and a coil 91, 94 which is connected in series with the changeover arrangement 92, 93, wherein the coil 91 in the first branch is provided on the side of the changeover arrangement 92 which is averted from the neutral point 40, and wherein the coil 94 in the second branch 82 is provided on the side of the changeover arrangement 93 which faces the neutral point 40. In the first branch 81, this arrangement can also be described as a Vienna cell, and in the second branch as the reverse or inverse Vienna cell.

The changeover arrangements 92, 93 respectively comprise at least one schematically represented controllable switch 110, and permit a current flow between the associated branch 81, 82 and the intermediate circuit 50, or the first conductor 51 and/or the second conductor 52 thereof. The changeover arrangements 92, 93 respectively comprise a first changeover arrangement terminal 102 and a second changeover arrangement terminal 113, by means of which they are connected to the associated first branch 81 or second branch 82.

The at least one controllable switch 110 is preferably an electronic switch, wherein a semiconductor switch is further preferred. For example, semiconductor switches of the MOSFET or IGBT type are appropriate.

A control device 99 is provided for the actuation of the changeover arrangements 92, 93, or particularly of the controllable switch 110.

In a first state Z1 of the at least one controllable switch 110, a current flow between the first terminal 21 and the neutral point 40 via the changeover arrangement 92 or 93 is suppressed and, in a second state Z2 of the at least one controllable switch 110, a current flow is possible between the first terminal 21 and the neutral point 40 via the changeover arrangement 92, 93.

By the changeover of the at least one controllable switch 110 to the second state Z2, a current is permitted between the terminal 21 and the neutral point 40, wherein the direction of the current flow is dependent upon the present value of the AC voltage (phase) on the first terminal 21. If the voltage on the first terminal 21 is more positive than the voltage on the neutral point 40 and the switch 110 of the changeover arrangement 92 assumes the second state Z2, a current flows from the first terminal 21 via the coil 91 and the changeover arrangement 92 to the neutral point 40. The current in the coil 91 rises over time, and energy is stored in the magnetic field of the coil 91. If the switch 110 is then switched to the first state Z1, the associated coil 91 or 94 can release the stored energy to the intermediate circuit 50 via the changeover arrangement 92 or 93.

In a conventional Vienna rectifier which, for example, comprises only the first branch 81 and no second branch 82 on the first terminal 21, the energy stored in the coil 91—depending upon whether the positive or negative half-wave is present on the first terminal or the direction in which energy has been stored in the coil—is either used for the first branch 51 only or for the second branch 52 only. The provision of the additional second branch 82, wherein the coil is arranged on the right-hand side in relation to the changeover arrangement 93, respectively permits either the first conductor 51 to be (positively) supplied via the upper branch 81 and the second conductor 52 to be (negatively) supplied via the lower branch 82, or the first conductor 51 to be (positively) supplied via the lower branch 82 and the second conductor 52 to be (negatively) supplied via the upper branch 81. Additional options for the supply of the intermediate circuit 50 are obtained accordingly and, in both a single-phase supply network and a triple-phase supply network, a DC voltage can be generated on the intermediate circuit 50 which varies less than in the absence of the lower branch 82. This effect has been observed to be particularly positive in a single-phase supply network, wherein the ripple current on the intermediate circuit can be significantly reduced. In a triple-phase supply network, the voltage variation on the intermediate circuit is already significantly smaller than in a single-phase supply network, such that the action of this effect is proportionally reduced.

The control device 99 preferably comprises an—unrepresented—voltage measuring device for the measurement of the respective voltage on the terminals 21, 22, 23 (phases). It is further preferred if the control device 99 comprises one or more of the following devices:
  A voltage measuring device for the measurement of voltage on the node point 53,
  A voltage measuring device for the measurement of voltage on the intermediate circuit 50,
  A current measuring device for the measurement of current on the intermediate DC circuit,
  A current measuring device for the measurement of the respective current of the circuit arrangements 31, 32, 33 on the first conductor 51 and on the second conductor 52.

For the achievement of a good power factor, the control device 99 actuates the circuit arrangements 31, 32, 33 or the changeover arrangements 92, 93 such that the current of the phase voltage follows the respective phase.

Given that a circuit arrangement 31, 32, 33 is provided on each of the terminals 21, 22, 23, an infeed to the first conductor 51 and/or to the second conductor 52 can be executed on each of the terminals during both the positive half-wave and the negative half-wave. This permits a variety of combinations, which are not possible in a simple Vienna rectifier.

Figure 4:
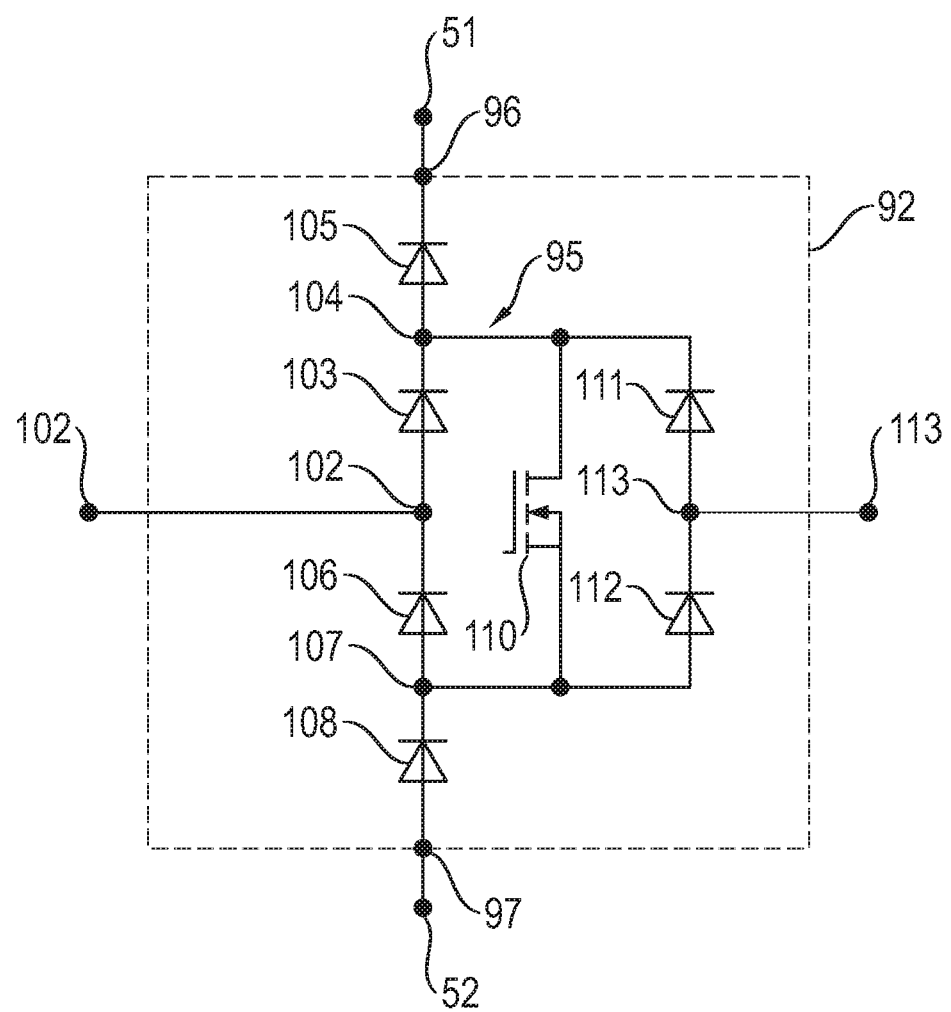
FIG. 4 shows an exemplary embodiment of a changeover arrangement according to FIG. 3.

FIG. 4 shows an exemplary embodiment of the changeover arrangement 92, wherein the same design can be employed for the changeover arrangement 93. The changeover arrangement 92 is configured in the manner of a Vienna rectifier.

The changeover arrangement 92 comprises a first changeover arrangement terminal 102, a second changeover arrangement terminal 113, a first output 96 and a second output 97. The changeover arrangement terminals 102, 113 can also be described as bridge rectifier terminals, and their function is to connect to the associated first branch 81 or second branch 82. The function of the first output 96 is to connect to the first conductor 51, and the function of the second output 97 is to connect to the second conductor 52.

The changeover arrangement 92 comprises a bridge rectifier 95 and the controllable switch 110, as described in greater detail hereinafter.

The changeover arrangement terminal 102 is connected via a diode 103 to a point 104, and the point 104 is connected via a diode 105 to the first output 96. The changeover arrangement terminal 102 is connected via a diode 106 to a point 107, and the point 107 is connected via a diode 108 to the second output 97. A controllable switch 110 is provided between the points 107 and 104. Although, in the exemplary embodiment, the switch 110 is configured as a MOSFET, other exemplary electronic switches, such as IGBTs, are also possible. The changeover arrangement terminal 113 is connected via a diode 111 to the point 104 and via a diode 112 to the point 107. The cathodes of the diodes 103, 105, 106, 108, 111, 112 are respectively switched-in or switched to the first output 96 on the side of the first conductor 51, and the anodes are respectively switched-in or switched to the second output 97 on the side of the second conductor 52. The mode of operation of a Vienna rectifier is described, for example, in EP 0 660 498 A2.

If the controllable switch 110 is switched to a first non-conducting state Z1, the bridge rectifier 95 functions in the manner of a normal bridge rectifier. A current can flow from the changeover arrangement terminals 102, 113 via the diodes 103, 105, 111 to the first output 96, and a current can flow from the second output 97 via the diodes 108, 106, 112 to the changeover arrangement terminals 102, 113, as the corresponding diodes in these directions are switched to the forward direction.

If, conversely, the controllable switch 110 is switched to a second conducting state Z2, a current can flow from the changeover arrangement terminal 102 via the diode 103, the controllable switch 110 and the diode 112 to the changeover arrangement terminal 113 or, conversely, a current can flow from the changeover arrangement terminal 113 via the diode 111, the controllable switch 110 and the diode 106 to the changeover arrangement terminal 102. In each case, moreover, a current can also flow from the changeover arrangement terminals 102 and/or 113 to the first output 51, and/or a current can flow from the second output 52 to the changeover arrangement terminals 102, 113.

Whether a current actually flows is dependent upon the voltage ratios on the changeover arrangement terminals 102, 113 and on the outputs 96, 97.

If the diodes 103, 104 are arranged on the side of the coil 91 or 94, the diodes 111, 112 can be configured with a lower rating than the diodes 103, 104, as they are subject to a lower loading.

Figure 5:
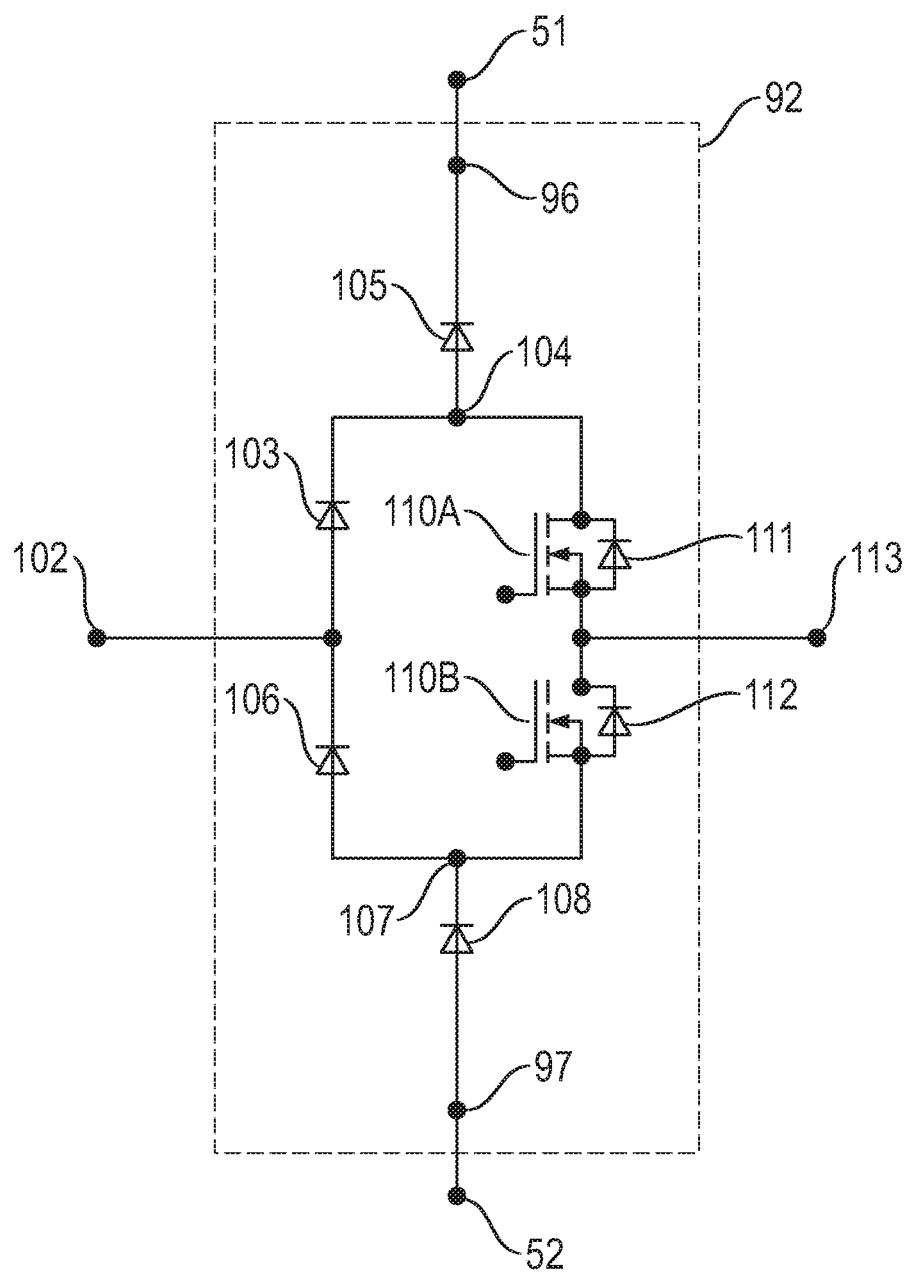
FIG. 5 shows a further exemplary embodiment of a changeover arrangement according to FIG. 3.

FIG. 5 shows a further embodiment of the changeover arrangement 92 according to FIG. 4. This also comprises the changeover arrangement terminals 102, 113, the diodes 103, 105, 106, 108, 111 and 112 and the points 104, 107, which are identified by the same reference numbers as in FIG. 4. The switch 110 in FIG. 4 has been replaced by two switches 110A, 110B. The switch 110A is connected in parallel with the diode 111, and the switch 110B is connected in parallel with the diode 112. The diodes 111, 112 can be configured as integrated inverse diodes of the respective semiconductor switch 110A, 110B, or as additional parallel-connected diodes, preferably with a low flux voltage, for example a Schottky diode. Preferably, the coil 91 or 94 is respectively connected on the side of the bridge rectifier terminal 102, such that the diodes 103, 106 are on the side of the coil 91 or 94. This permits a reduction of the current flowing in the switches 110A, 110B, and facilitates the commutation thereof. Additionally, in this embodiment, switches 110A, 110B without integrated inverse diodes can be employed, for example cost-effective IGBT switches. However, both variants are possible.

The switch 110A, in the conducting second state Z2, permits a current flow from point 104 to the changeover arrangement terminal 113, and the switch 110B, in the conducting second state Z2, permits a current flow from the changeover arrangement terminal 113 to the point 107.

In the first non-conducting state of the switches 110A, 110B, the changeover device 92 behaves in the manner of the changeover device 92 according to FIG. 4. In the second conducting state of the switches 110A, 110B, the changeover device 92 permits a current flow from the changeover arrangement terminal 102 via the diode 103 and the switch 110A to the changeover device terminal 113, or a current flow from the changeover arrangement terminal 113 via the switch 110B and the diode 106 to the changeover device terminal 102. Conversely to the embodiment according to FIG. 4, this circuit features lower transmission losses as, unlike FIG. 4, two diodes are connected in series in the conducting switch 110.

Conversely to the changeover device 92 according to FIG. 4, the changeover device 92 according to FIG. 5 is asymmetrical with respect to the changeover device terminals 102, 113. The changeover device terminal 113 can be provided in the form of the bridge rectifier terminal 113 which is assigned to the coil 91, or alternatively the changeover device terminal 102. The second-mentioned variant (diodes 103, 106 and the bridge rectifier terminal 102 on the side of the coil 91) features the lower losses on the switches 110A, 110B.

Figure 6:
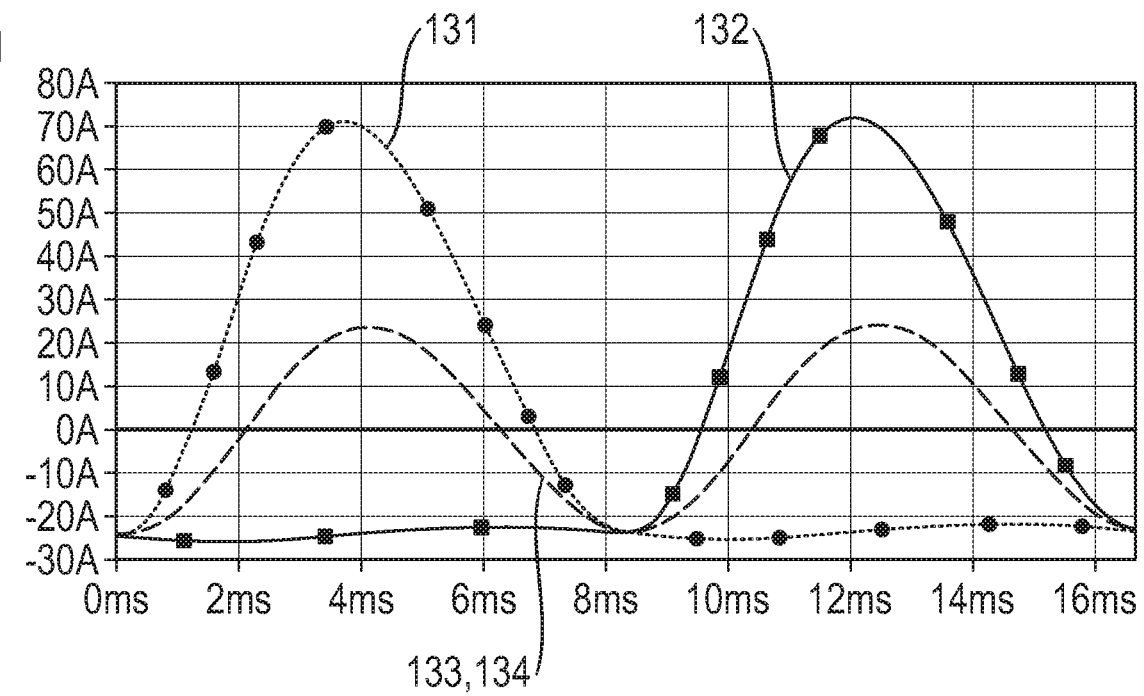
FIG. 6 shows a representation of the current on the intermediate circuit capacitors.

FIG. 6 shows a diagram of the simulated current on the upper and lower capacitors of the intermediate circuit in the rectifier assembly 20 and, by way of comparison, in a corresponding Vienna rectifier. The simulation has been executed with the following marginal conditions:

Supply network: US split-phase with HOT1, HOT2 and a frequency of 60 Hz

Capacitance of the capacitors of the intermediate circuit: upper capacitor: $C\_O=1.3$ mF, and lower capacitor: $C\_U=1.3$ mF Voltage on the intermediate circuit: U=800 V Electrical output power: P=19.2 kW The diagram shows the respective current. A current greater than zero corresponds to an infeed of energy to the respective capacitor, and a current lower than zero corresponds to an output of energy from the respective capacitor.

The curves 131 or 132 show the current in the upper capacitor of the intermediate circuit or in the lower capacitor of the intermediate circuit, in a Vienna rectifier. In each case, power is supplied either to the upper capacitor or to the lower capacitor. It will be seen that the respective capacitor which is not supplied by the source is discharged. Accordingly, during the time in which it is supplied, it must be charged with double the power. The maximum positive current is approximately 73 A, and the maximum negative current is approximately −26 A.

The curves 133, 134 overlap, and show the current in the upper capacitor of the intermediate circuit or in the lower capacitor of the intermediate circuit, in a Weissach rectifier 20. In the simulation, the connection between the neutral point 40 and the node point 53 according to FIG. 1 has been omitted, as this is advantageous for the US split-phase supply network employed. By means of the circuit arrangements 31, 32, 33, it is possible to charge both the upper capacitor 61 and the lower capacitor 62 respectively, according to FIG. 1. As a result, the requisite current can be reduced by the capacitors 61, 62, whilst maintaining the same electrical output power. The maximum positive current is approximately 25 A, and the maximum negative current is approximately −25 A.

The r.m.s. value (root mean square value) of the current in the intermediate circuit capacitors is 34 A in the Vienna rectifier, and 17 A in the Weissach rectifier. Therefore, the loading of the intermediate circuit 50, in the event of single-phase charging, is significantly lower in the Weissach rectifier 20 than in the Vienna rectifier. This permits a longer service life of the capacitors 61, 62.

Figure 7:
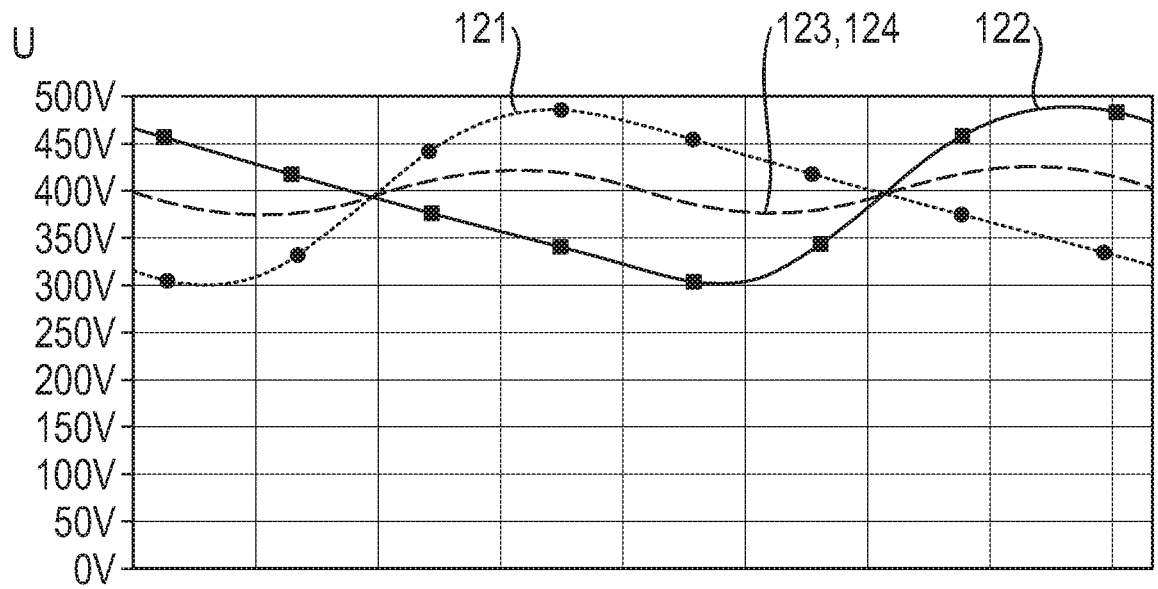
FIG. 7 shows a diagram of the voltage on the intermediate circuit capacitors.

FIG. 7 shows a diagram of the simulated voltage on the intermediate circuit 50, corresponding to the simulation according to FIG. 6.

The curves 121 or 122 show the voltage on the upper conductor of the intermediate circuit (corresponding to conductor 51 in FIG. 1) or on the lower conductor of the intermediate circuit (corresponding to conductor 52 in FIG. 1) of the Vienna rectifier. The maximum voltage is approximately 480 V, and the minimum voltage is approximately 300 V. This produces a voltage ripple of the order of 180 V.

The curves 123, 124, which are mutually overlapping, show the voltage on the upper conductor 51 and on the lower conductor 52 of the intermediate circuit of the Weissach rectifier 20—c.f. FIG. 1. The maximum voltage is approximately 424 V, and the minimum voltage is approximately 376 V. This produces a voltage ripple of the order of 48 V.

As can be seen, the more consistent power injection associated with the Weissach rectifier 20, in a US split-phase supply network, results in a lower fluctuation in voltage amplitude, or a reduced voltage ripple. The voltage ripple of the Weissach rectifier 20 is equivalent to approximately 27% of the voltage ripple of the Vienna rectifier.

As a result of the lower voltage ripple, for an equal average voltage, the minimum voltage of the Weissach rectifier 20 is greater than that of a Vienna rectifier. Consequently, for example, in a down-stream buck converter, a lower intermediate circuit voltage can be selected for a Weissach rectifier 20 than for a Vienna rectifier. This improves the efficiency of the buck converter, thereby resulting in a higher efficiency of the entire device.

Figure 8:
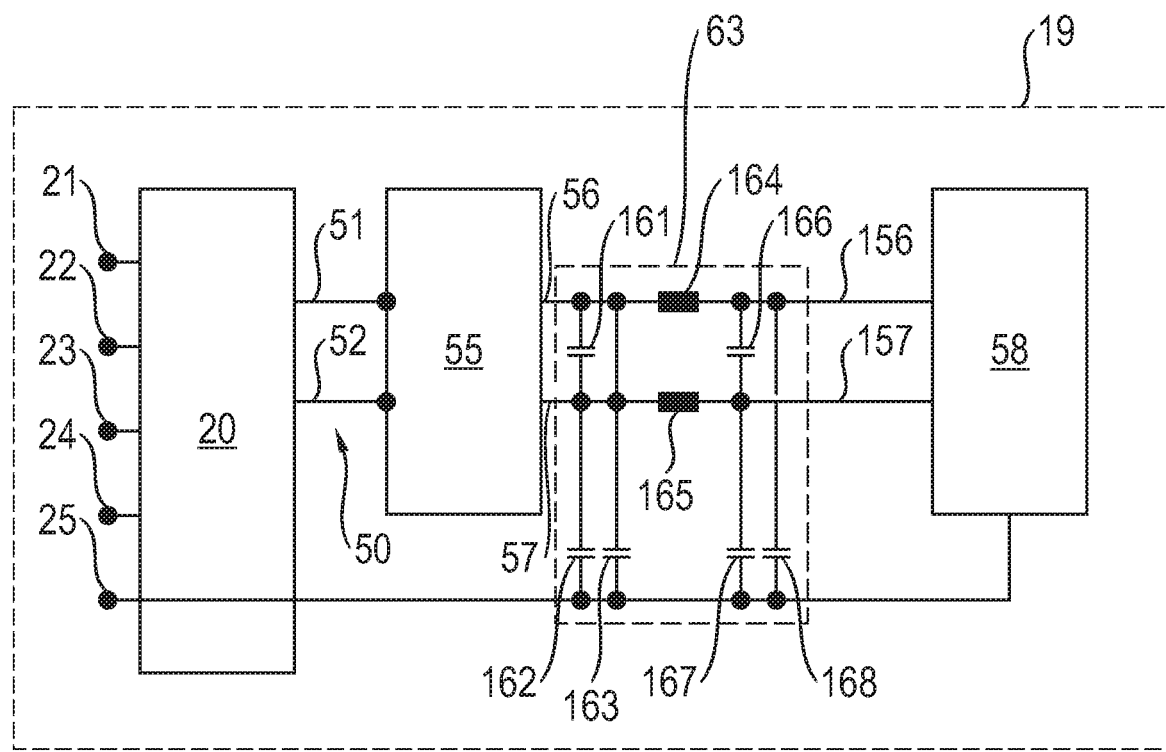
FIG. 8 shows an exemplary use of the rectifier assembly in a vehicle.

FIG. 8 shows a schematic representation of a vehicle 19, in which the rectifier assembly 20 according to FIG. 1 is provided. The vehicle can be, for example, a land vehicle, a watercraft or an aircraft. The first conductor 51 and the second conductor 52 are connected to a DC voltage converter (DC/DC converter) 55, in order to supply the latter with energy from the intermediate circuit 50. The DC voltage converter 55 is configured, for example, as a buck converter.

On the output of the DC voltage converter 55, for example, conductors 56, 57 and an EMC filter 63 are provided. The EMC filter 63 has an X-capacitor 161, which is connected between the conductors 56, 57, a Y-capacitor 162 between the conductor 57 and the terminal 25 (the protective conductor PE) and a Y-capacitor 163 between the conductor 56 and the terminal 25. Thereafter, the conductors 56, 57 are respectively connected via an inductance 164 or 165 with conductors 156 or 157. Thereafter, an X-capacitor 166, which is connected between the conductors 156, 157, a Y-capacitor 167 between the conductor 157 and the terminal 25 (the protective conductor PE) and a Y-capacitor 168 between the conductor 156 and the terminal 25 are provided. The EMC filter 63 can also be configured with a multi-stage design.

The function of the Y-capacitors is to reduce interference voltages, which occur vis-à-vis the potential on the protective conductor terminal 25. They customarily have a lower capacitance than the capacitors 61, 62 according to FIG. 1. The reduction of interference voltages is achieved by the flow of a discharge current between the protective conductor terminal 25 and the conductor 56 or 57. The function of the X-capacitors is the damping of the differential-mode interference voltage between the terminals 56 and 57. Discharge currents from or to the protective conductor PE are applied across the EMC filter 63.

The conductors 156, 157 are connected to a load 58, specifically a vehicle battery (traction battery) for a motor vehicle with an electric drive system, or, for example, a heating device. In the exemplary embodiment, in the part of the vehicle 19 represented, no transformer is provided. Customarily, motor vehicles having a charging device for a traction battery incorporate a transformer, and this results in galvanic separation between the external network and the components which are provided on the in-vehicle side of the transformer. As a consequence, discharge currents on the in-vehicle side of the transformer have no effect upon the side of the transformer which is external to the vehicle. Consequently, such discharge currents cannot result in the tripping of a network fuse. In the exemplary embodiment represented, conversely, no transformer and no galvanic separation is present and, in consequence, the reduction of discharge currents by a reduced fluctuation of the intermediate circuit voltage is advantageous.

Figure 9:
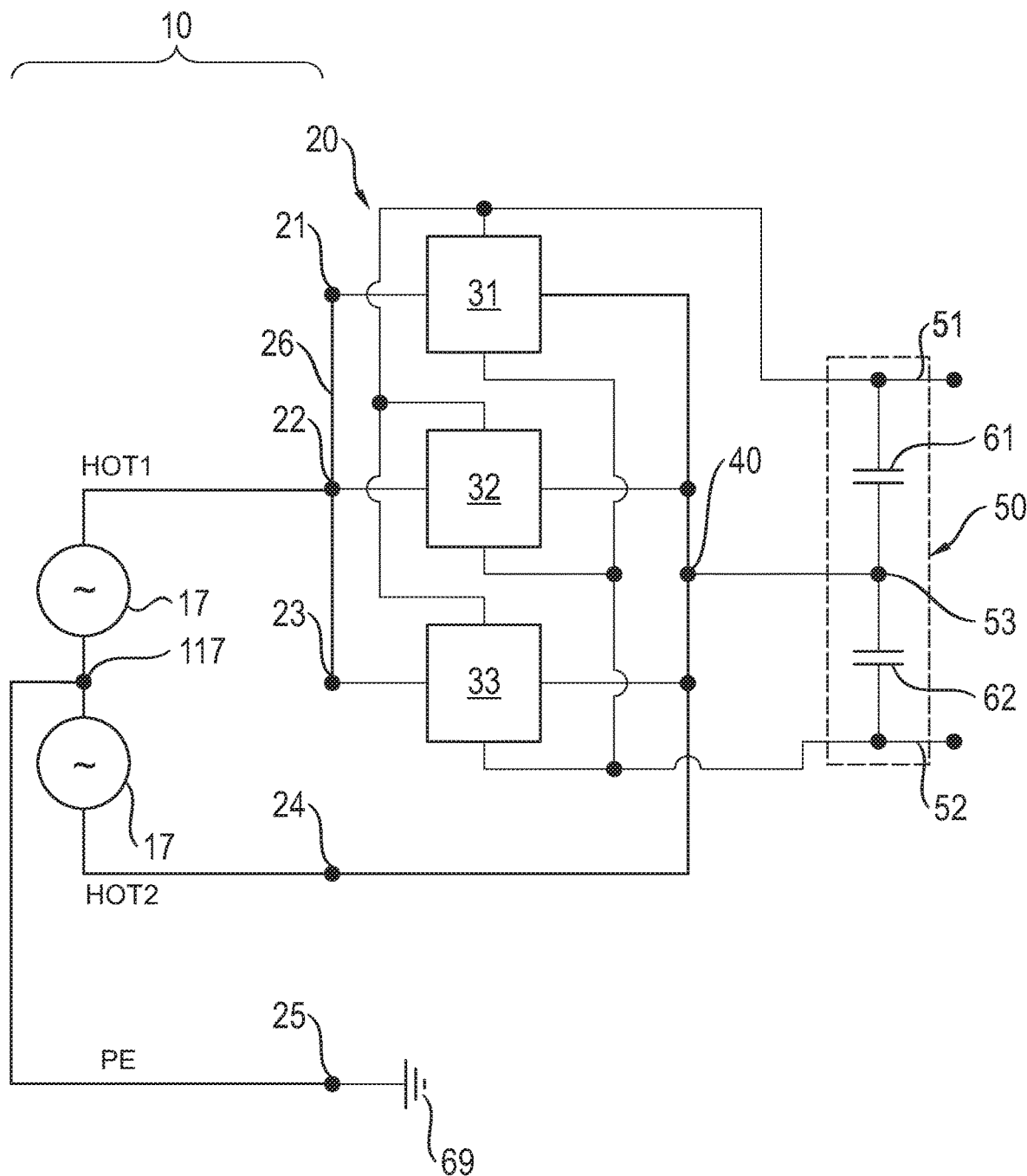
FIG. 9 shows a further embodiment of the rectifier assembly, with circuit arrangements.

FIG. 9 shows a further embodiment of the rectifier assembly 20, which is connected, for example, to a US split-phase supply network 10. The supply network 10 makes the phases HOT1, HOT2 and the protective conductor PE available. This is represented schematically by two AC voltage sources 17, which are interconnected at a point 117. The point 117 is simultaneously provided as a protective conductor terminal PE, with corresponding—and unrepresented—grounding.

The terminals 21, 22, 23 are interconnected by means of at least one conductor 26, such that current can flow between HOT1 and HOT2 through all the circuit arrangements 31, 32, 33. As a result, current flowing in the individual circuit arrangements 31, 32, 33, is reduced, and these can be rated for lower maximum currents.

On a terminal of a US split-phase supply network, having a desired total charging capacity of 19.2 kW and an associated total current of the order of 80 A, the individual circuit arrangements, on the first three terminals, can be rated, for example, to 7.2 kW. At very high total capacities, further circuit arrangements can also be connected in parallel.

In a single-phase European terminal, the parallel circuit is also advantageously constituted by L1 on the first terminals and N on the second terminal (or vice versa).

By definition, in the context of the present invention, numerous variations and modifications are possible.

In actual forms of embodiment, further components are preferably present, for example EMC filters, power factor controllers and/or insulation monitoring circuits.

On the terminals 21, 22, 23, on the input side, additional filter coils can be provided, which are also described as interference suppression chokes. In general, EMC filters and network filters can additionally be provided on the input side.

In each case, the diodes can be replaced by switches which, depending upon the voltage on the respective switch, are switched to a conducting or a non-conducting state, and thus function in the manner of a diode. However, this is a complex arrangement, and the diodes are preferred.

By means of the present Weissach rectifier, high-power charging devices are possible. In charging devices with a triple-phase connection and a 400 V voltage amplitude, for example, a DC voltage of 800 V can be generated on the intermediate circuit 50, and a power of 22 kW can be delivered.

What is claimed is:

1. A rectifier assembly (20) for the rectification of an AC voltage into a DC voltage,
which rectifier assembly (20) comprises at least one first terminal (21, 22, 23), a second terminal (24) and an intermediate circuit (50),
which intermediate circuit (50) comprises a first conductor (51), a second conductor (52) and at least one capacitor (61, 62) between the first conductor (51) and the second conductor (52),
which at least one first terminal (21, 22, 23) is connected via an associated circuit arrangement (31, 32, 33) to a neutral point (40), and which second terminal (24) is likewise connected to the neutral point (40),
which circuit arrangement (31, 32, 33) comprises a first branch (81) and a second branch (82), which second branch (82) is connected in parallel with the first branch (81), which first branch (81) and second branch (82) respectively comprise a changeover arrangement (92, 93) and a coil (91, 94) connected in series with said changeover arrangement (92, 93), which coil (91) in the first branch (81) is provided on the side of the changeover arrangement (92) which is averted from the neutral point (40), and which coil (94) in the second branch (82) is provided on the side of the changeover arrangement (93) which faces the neutral point (40),
which changeover arrangements (92, 93) respectively comprise at least one controllable switch (110; 110A, 110B) and permit a current flow between the associated branch (81, 82) and the intermediate circuit (50),
wherein, in a first state (Z1) of the at least one controllable switch (110; 110A, 110B), a current flow between the first terminal (21, 22, 23) and the neutral point (40) via the changeover arrangement (92, 93) is suppressed, and wherein, in a second state (Z2) of the at least one controllable switch (110; 110A, 110B), a current flow between the first terminal (21, 22, 23) and the neutral point (40) via the changeover arrangement (92, 93) is possible.

2. The rectifier assembly of claim 1, wherein the at least one first terminal (21, 22, 23) comprises at least three first terminals (21, 22, 23) that are connected via the respectively associated circuit arrangement (31, 32, 33) to the neutral point (40).

3. The rectifier assembly of claim 1, wherein the at least one first terminal (21, 22, 23) comprises at least two first terminals (21, 22, 23) that are connected via the respectively associated circuit arrangement (31, 32, 33) to the neutral point (40), and which at least two first terminals (21, 22, 23) are electrically interconnected.

4. The rectifier assembly of claim 1, wherein the at least one first terminal (21, 22, 23) comprises a single first terminal (21).

5. The rectifier assembly (20) of claim 1, further comprising a control device (99) configured to influence the at least one controllable switch (110; 110A, 110B).

6. The rectifier assembly (20) of claim 5, wherein the control device (99) is configured for at least temporary pulsed actuation of the at least one controllable switch (110; 110A, 110B).

7. The rectifier assembly (20) of claim 5, wherein the control device (99) is configured to simultaneously switch the at least one controllable switch (110; 110A, 110B) of the first branch (81) and the at least one controllable switch (110; 110A, 110B) of the second branch (82) of one of the least one first terminals (21, 22), at least temporarily, to the first state.

8. The rectifier assembly (20) of claim 5, wherein the control device (99) is configured, on one of the at least one first terminals (21, 22, 23), at least temporarily, to set the at least one controllable switch (110; 110A, 110B) of the first branch (81) to the first state (Z1), and to set the at least one controllable switch (110; 110A, 110B) of the second branch (82) to the second state (Z2), or vice versa.

9. The rectifier assembly of claim 1, wherein at least one of the changeover arrangements (92, 93) comprises a bridge rectifier (95) having two bridge rectifier terminals (102, 103), a first output (96), a second output (97) and the at least one controllable switch (110; 110A, 110B), the bridge rectifier terminals (102, 103) being connected to the associated branch (81, 82), the first output (96) being connected to the first conductor (51), the second output (97) being connected to the second conductor (52), and the bridge rectifier (95) is configured:

in the first predefined state (Z1) of the at least one controllable switch (110; 110A, 110B), to permit a current flow from at least one of the bridge rectifier terminals (102, 113) to the first output (96), but to prevent a current flow from the first output (96) to the bridge rectifier terminals (102, 113), in the first predefined state (Z1) of the at least one controllable switch (110; 110A, 110B), to permit a current flow from the second output (97) to at least one of the bridge rectifier terminals (102, 113), but to prevent a current flow from the bridge rectifier terminals (102, 113) to the second output (97), in the first predefined state (Z1) of the at least one controllable switch (110; 110A, 110B), to suppress a current flow between the two bridge rectifier terminals (102, 103), and in the second predefined state (Z2) of the at least one controllable switch (110; 110A, 110B), to permit a current flow between the two bridge rectifier terminals (102, 103), in at least one direction.

10. The rectifier assembly (20) of claim 9, wherein the bridge rectifier terminals (102, 113) are connected respectively via a first diode (103, 111) to a first point (104), and connected via a second diode (106, 112) to a second point (107), wherein the first point (104) is connected via a third diode (105) to the first output (96), and the second point (107) is connected via a fourth diode (108) to the second output (97).

11. The rectifier assembly (20) of claim 10, wherein the at least one controllable switch (110; 110A, 110B) comprises a first controllable switch (110) that is connected between the first point (104) and the second point (107), and the first controllable switch (110) is non-conducting in the first state (Z1) and is conducting in the second state (Z2) such that, in the second state (Z2), a connection is constituted between the first point (104) and the second point (107).

12. The rectifier assembly (20) of claim 11, wherein the at least one controllable switch (110; 110A, 110B) comprises a second controllable switch (110A) and a third controllable switch (110B), the two bridge rectifier terminals (102, 113) comprise a first bridge rectifier terminal (113) and a second bridge rectifier terminal (102), the second controllable switch (110A) is connected between the first bridge rectifier terminal (113) and the first point (104), and the third controllable switch (110B) is connected between the first bridge rectifier terminal (113) and the second point (107).

13. The rectifier assembly (20) of claim 12, wherein the first bridge rectifier terminal (113) is the bridge rectifier terminal (113) that is assigned to the associated coil (91, 93).

14. The rectifier assembly (20) of claim 12, wherein the second bridge rectifier terminal (102) is the bridge rectifier terminal (113) that is assigned to the associated coil (91, 93).

* * * * *